United States Patent [19]
Davidson et al.

[11] Patent Number: 5,462,367
[45] Date of Patent: Oct. 31, 1995

[54] COMPACT BEARING AND STIFFENED JOURNAL

[75] Inventors: Rickie L. Davidson, Massillon; Samuel R. Williams, Canton, both of Ohio

[73] Assignee: The Timken Company, Canton, Ohio

[21] Appl. No.: 292,939

[22] Filed: Aug. 18, 1994

[51] Int. Cl.⁶ ................................................ F16C 33/36
[52] U.S. Cl. ........................ 384/459; 384/584; 384/571
[58] Field of Search ...................................... 354/549, 504, 354/505, 506, 537, 542–544, 559, 571, 584, 585

[56] References Cited

U.S. PATENT DOCUMENTS

| | | |
|---|---|---|
| 2,851,315 | 9/1958 | Zavoda . |
| 2,875,004 | 2/1959 | McNicoll ................................ 384/459 |
| 2,981,574 | 4/1961 | McNicoll ................................ 384/459 |
| 3,741,614 | 6/1973 | Judge ..................................... 384/459 |
| 3,869,180 | 3/1975 | Sonnerat ............................... 384/459 |
| 4,770,424 | 9/1988 | Otto ........................................ 277/25 |
| 4,819,949 | 4/1989 | Otto ........................................ 277/29 |
| 5,017,025 | 5/1991 | Williams ............................... 384/584 |

FOREIGN PATENT DOCUMENTS

| | | | |
|---|---|---|---|
| 17442 | 5/1971 | Japan ....................................... | 384/459 |
| 1349340 | 4/1974 | United Kingdom ................... | 384/584 |

Primary Examiner—Thomas R. Hannon
Attorney, Agent, or Firm—Polster, Lieder, Woodruff & Lucchesi

[57] ABSTRACT

A compact antifriction bearing fits around a journal at the end of an axle for a rail car. The journal extends from an intervening section of the axle, and the intervening section in turn projects from a still larger main section, there being fillets where the sections merge. A backing ring fits against the fillet at the end of the journal, while an end cap fits over the opposite end of the journal. The bearing includes two cones which are clamped between the end cap and backing ring, a double cup surrounding the cones, and tapered rollers arranged in two rows between raceways on the cones and on the cup. The ends of the bearing are closed by seals which are fitted to the cup and cone. The thicker intervening section of the axle is extended in comparison to its counterparts on traditional axles, and the backing ring extends axially along the journal generally no further than the location at which the fillet emerges from the main body of the journal. This presents the back face of the inboard cone in a region where the journal is quite stiff, thereby reducing flexing and fretting considerably. The inboard cone is undercut at its back face so that the stress concentration produced at the end of the interference fit does not coincide with the stress concentration that develops at the fillet around which the backing ring fits.

16 Claims, 1 Drawing Sheet

COMPACT BEARING AND STIFFENED JOURNAL

BACKGROUND OF THE INVENTION

This invention relates in general to bearings and more particularly to a bearing together with a stiffened axle journal which experiences less fretting in operation.

Most rail cars used by railroads in the United States rely on antifriction bearings to reduce friction and thereby lessen the tractive effort required to move such cars. Typically, the wheels of such cars are fitted to axles with which they rotate. Each axle extends beyond its wheels in the form of journals that are of a lesser diameter than the remainder of the axle. The bearings fit snugly over the journals and into housings which in turn are received in side frames for a truck. Being the thinnest portion of the axle and at the locations where the weight of the rail car is transferred to the axle, the journals tend to flex as the rail car moves over the rails, at least when the rail car is heavily loaded.

The flexure is perhaps most pronounced at the inboard end of each bearing. Here the typical journal is fitted with a seal wear ring that extends between the inner race of the bearing and a backing ring which fits over a fillet located where the journal merges into a larger adjoining portion of the axle often referred to as the dust guard portion. The wear ring provides a cylindrical surface around which a seal fits to retain lubrication within the bearing and to prevent the entry of contaminants. Both the inner race and the wear ring, at least where the wear ring abuts the inner race, fit snugly over the journal. By reason of the flexure in the journal, fretting occurs between the journal, on one hand, and the inner race and inboard wear ring on the other.

The fretting erodes the journal and thereby produces a looser fit between the inner race and wear ring and the journal. This looser fit compounds the fretting. In severe cases the fretting can lead to overheating and bearing distress. Moreover, the axle is weakened, and the effectiveness of the seal is diminished, because the wear ring around which it is fitted does not remain concentric with the journal.

To be sure, others have addressed the fretting problem along the journals of rail car axles. These efforts have included increasing the surface hardness of the axle journal, increasing the surface area of the wear ring in contact with the journal and even separating the wear ring entirely from the surface of the journal by using the backing ring to center it with regard to the journal instead of the journal itself. All have increased the cost of the bearing or its installation.

The present invention resides in the combination of a bearing and axle journal which thwarts fretting along the journal. Seals, which close the ends of the bearing, are fitted to and operate along the races of the bearing thus eliminating the wear rings. This in turn shortens the journal, making it stiffer. Indeed, the inner race is located about where the journal fillet begins, so the location where fretting is traditionally the greatest is in a very stiff region of the journal—a region where flexure is minimum. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
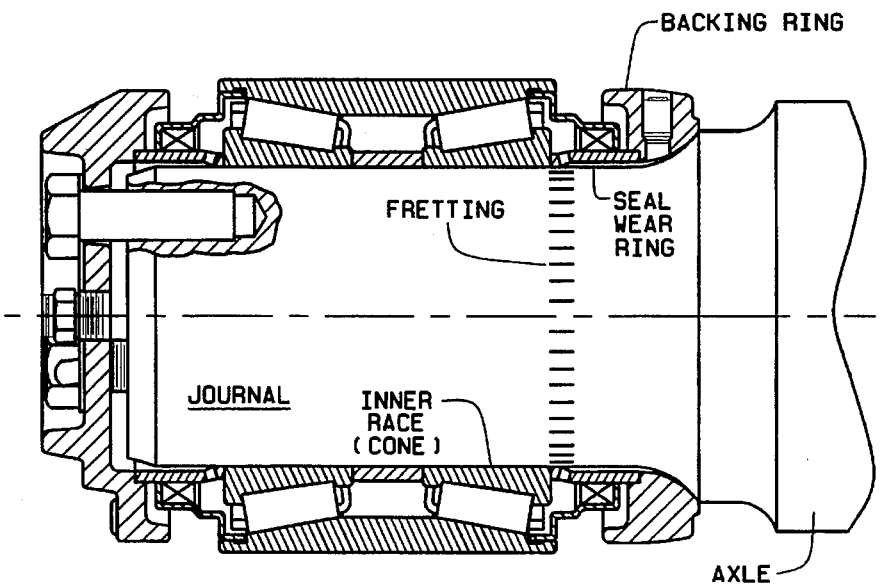
FIG. 1 is a sectional view of a conventional bearing fitted to an axle journal and showing the location where fretting develops.
Figure 2:
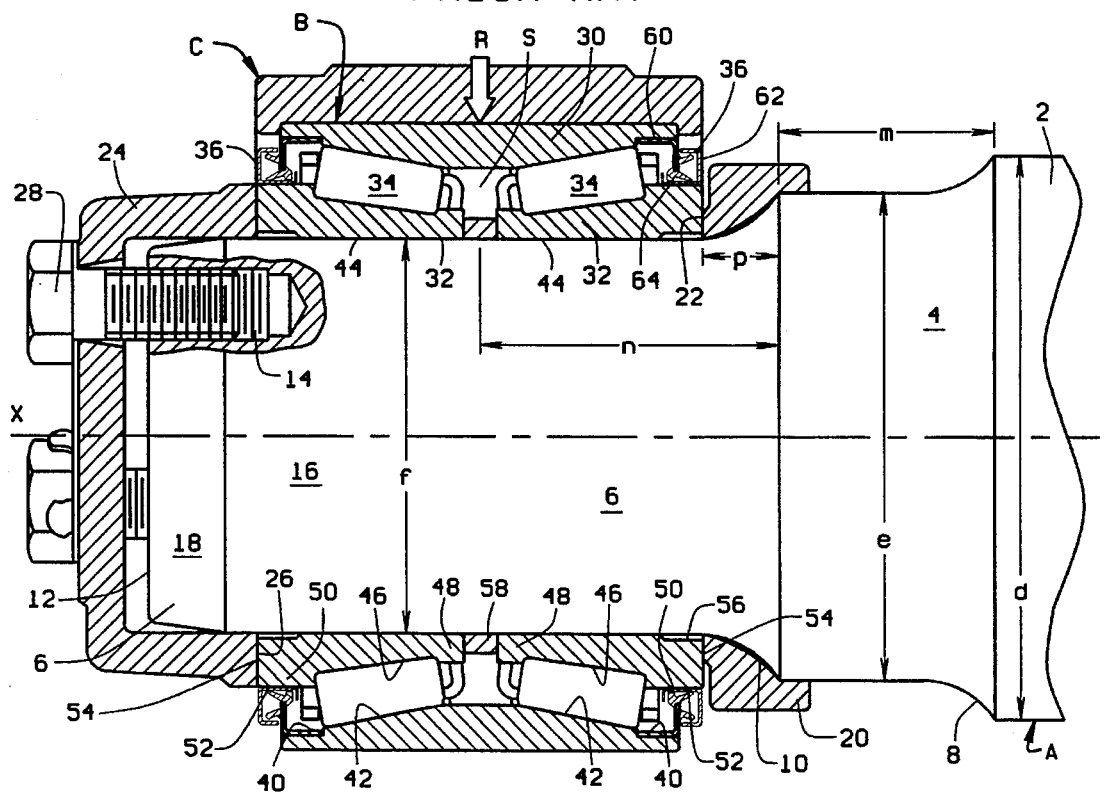
FIG. 2 is a sectional view of an axle and a bearing and related components constructed in accordance with the present invention.

Referring now to the drawings (FIG. 2) an axle A rotates within an antifriction bearing B about an axis X. The bearing B is in turn contained within a housing C. Typically, the arrangement is part of a rail car, the axle A being fitted with wheels and the housing C being received in a truck or some other appliance forming part of the suspension system for the rail car. The axle A, owing to the construction of the bearing B, undergoes considerably less flexure than traditional rail car axles, and as a consequence fretting is less likely to develop along the axle A.

The axle A has a main section 2 which extends between and beyond the wheels. At each end it has a reduced intervening section 4, sometimes called a dust guard portion, and a journal 6 located beyond the intervening section 4. The main section 2 merges into the intervening section 4 at a fillet 8, and the intervening section 4 merges into the journal 6 at another fillet 10, both fillets 8 and 10 having essentially the same radius of curvature. The journal 6 at its opposite end has an end face 12 which is squared off with respect to the axis X. Here the journal 6 has threaded holes 14 which lie around and parallel to the axis X. The main section 2, intervening section 4 and journal 6 are all essentially cylindrical and concentric, the axis X being common to all. Indeed, the journal 6 has an extended cylindrical surface 16 which lies between its fillet 10 and a slightly tapered surface 18 which runs out to the end face 12 of the axle A. The main section 2 has a diameter d, the intervening section a diameter e, and the extended surface 16 of the journal a diameter f. The intervening section 4 has a length m, whereas along the journal 6 a distance n exists between the end of the intervening section 4 and the midpoint of the bearing B. The fillet 10 at the end of the journal 6 has a length p. The following dimensional relationships exist in the axle shaft A:

$e > 0.84d$ $f > 0.81e$ $n < 0.78f$ $d > e > f$

Basically, the diameter e of the reduced intervening section 4 is at least as great as its counterpart in traditional axles, but its length m is greater. On the other hand, the distance n between the midpoint of the bearing B and the inboard end of the journal 6, is shorter than its counterpart in traditional bearings. The variations in the dimensional relationship between the axle A and traditional axles serve to stiffen the end of the axle A, particularly its journal 6, and thereby reduce flexing in operation. This in turn reduces fretting.

At the inboard end of the journal 6 a backing ring 20 abuts the small fillet 10. The backing ring 20 overlies the end of the reduced section 4 and further extends axially along the fillet 10 to cover the entire fillet 10, but little if any of the adjoining cylindrical surface 16. The backing ring 20 terminates at an end face 22 which is squared off with respect to the axis X and lies essentially at the location where the fillet 10 emerges from the cylindrical surface 16. In other words, the backing ring 20 projects along the fillet 10 for substantially the length p of the fillet 10, its end face 22 being essentially the distance p from the opposite end of the fillet 10.

At the outboard end of the journal 6, an end cap 24 fits over the slightly tapered surface 18 and across the end of the axle A. It terminates at an end face 26 which lies along the extended cylindrical surface 16 and is presented toward the end face 22 on the backing ring 20. Like the end face 22, the end face 26 is squared off with respect to axis X. The end cap 24 is held on journal by cap screws 28 which pass through the end cap 24 and engage the threads of the threaded holes 14. The end cap 24 and screws 28 retain the bearing B on the journal 6.

The bearing B encircles the journal 6 between the end cap 24 and the backing ring 20. It includes an outer race in the form of a double cup 30, an inner race in the form of two cones 32, and tapered rollers 34 arranged in two circular rows between the cup 30 and the two cones 32. The rollers 34 occupy an annular space S between the cup 30 and the two cones 32—a space which represents the interior of the bearing B. The space S is closed at its ends by seals 36 which are fitted to the cup 30 and cones 32. Actually, the seals 36 establish dynamic fluid barrier between the cup 30 and cones 32 and thus allow the latter to rotate within the former while still closing the end of the annular spaces.

Considering the bearing B more specifically, its cup 30 has end bores 40 which open out of its ends and tapered raceways 42 which are presented inwardly toward the axis X and taper downwardly from the end bores 40 toward the midpoint of the bearing B. The raceways 42 encircle the two cones 32, there being a separate cone 32 within each raceway 42.

Each cone 32 has a through bore 44, through which the journal 6 extends, the diameter of the bore 44 being slightly smaller than the diameter f of the cylindrical surface 16 for the journal 6, so that an interference fit exists between the cone 32 and the journal 6. Each cone 32 also has a raceway 46 which is presented outwardly away from the axis X and toward one of the raceways 42 of the cup 30. Like the cup raceway 42 that it faces, each cone raceway 46 tapers downwardly toward the midpoint of the bearing B. At the small end of its raceway 46, each cone 32 has a retaining rib 48 while at the large end of its raceway 46 it has a thrust rib 50. The two ribs 48 and 50 project outwardly beyond their respective ends of the raceway 46. While traditional tapered roller bearings have thrust ribs, the thrust rib 50 of each cone 32 in the bearing B is extended, providing a cylindrical mounting surface 52 of some length that lies within the end bore 40 at the corresponding end of the cup 30. The surface 52 runs out to a back face 54 which is squared off with respect to the axis X and forms the end of the cone 32—and indeed an end of the bearing B as well. Finally, the bore 44 of each cone 32 opens into an undercut 56 in the region of the back face 54 for the cone. The length of the undercut 56 does not exceed the length of the thrust rib 50, so the undercut 56, while underlying the thrust rib 50, does not underlie the raceway 46. The undercut 56 merges with the bore 44 along a beveled surface which also forms part of the undercut 56.

The tapered rollers 34 fit between the opposed raceways 42 and 46 on the cup 30 and cones 32, respectively, with their tapered side faces being against the raceways 42 and 46 and their large end faces against the thrust ribs 50. By reason of the tapered geometry, radially directed loads transmitted through the bearing B translate into slight axial force components which would expel the rollers 34 from the annular space S between the cup 30 and cones 32 were it not for the thrust ribs 50 on the cones 32.

The inboard cone 32 at its back face 54 abuts the backing ring 20 along its end face 22. The back face 54 of the outboard cone 32, on the other hand, bears against the end face 26 of the end cap 24 which is urged toward the outboard cone 32 by the cap screws 28, so that the two cones 32 are clamped between the end cap 24 and the backing ring 20. But the cap screws 28 do not control the setting for the bearing B. Instead, the two cones 32 are separated by a spacer 58 which fits between their retaining ribs 48, it being ground to provide the bearing with a predetermined setting, either in end play or preload, when the two cones 32 abut it at their retaining ribs 48.

The change in contour where the fillet 10 emerges from the extended cylindrical surface 16 of the journal 6 creates a stress concentration in the journal 6. Stress concentrations also exist at the edges of press fits and the press fit between the journal 6 and the inboard cone 32 is no exception. But the stress concentration produced by the interference fit does not coincide with the stress concentration caused by the fillet 10 owing to the undercut 56 in the inboard cone 32. The offset in the two stress concentrations enhances the fatigue life of the journal 6. The undercut 56 in the outboard cone 32, while not serving to separate stress concentrations, does render the two cones 32 interchangeable and permits a reverse installation. The undercut 56 on each cone 32, being confined to the region of the thrust rib 50 for the cone and not underlying the raceway 46, does not diminish the capacity of the cone 32 to transmit radial loads.

The seals 36 fit into the end bores 40 of the cup 30 and around the cylindrical surfaces 52 on the thrust ribs 50 of the two cones 32 and thereby close the ends of the annular space S occupied by the rollers 34. Each seal 36 includes a case 60 which is pressed into one of the end bores 40 in the cup 30 and a shield 62 which is pressed over the cylindrical surface 52 for the thrust rib 50 of the cone 32 at the corresponding end of the bearing B. Both the case 60 and the shield 62 are relatively rigid, being formed preferably as metal stampings. The interference fits between the case 60 and the surface of the end bore 40 and between the shield 62 and the cylindrical surface 52 of the thrust rib 50 produce static fluid barriers at those locations. In addition, each seal 36 includes an elastomeric seal element 64 which is bonded to the case 60 and extends out to surfaces of the shield 62 along which it establishes dynamic or live fluid barriers. The seals 36 may resemble those disclosed in U.S. Pat. No. 4,819,949 entitled Shielded Seal Assembly.

The load transmitted through the bearing B passes through rollers 34 of the two rows, it being divided generally equally between those rows. As a consequence, the load resolves into a resultant R which located midway between the two rows of rollers 34. The distance between the resultant R and the fillet 8 at which the reduced intervening section 4 of the axle A merges into the main section 2 remains essentially the same as the corresponding distance on traditional axles. In other words, the combined dimension m +n does not change. But the length m of the reduced intervening section 4 for the axle A is greater than the corresponding dimension on traditional axles, while the distance n between the resultant R and the large end of the fillet 10 is less than the corresponding distance on traditional axles. The extension of the thicker intervening section 4 and the reduction of the journal 6 renders the end of the axle A stiffer than the ends of traditional axles. As a consequence, the journal 6 experiences less flexure in the region of the back face 54 for the inboard cone 32. Indeed, the distance p between the back face 54 of that cone 32 and the inboard end of journal 6 is quite short, it being essentially the length of the backing ring 20, since no seal wear ring exists in the region to require extension of the journal 6. Yet the bearing B remains as a preassembled and prelubricated unit that is installed over the journal 6 as such. Indeed, the bearing B, owing to the absence of the seal wear rings, has less parts than traditional rail car axle bearings, and of course is shorter. The seals 36 serve to unitize the bearing B for handling purposes in that they prevent the cones 32 and spacer 58 from being withdrawn from the cup 30.

Seals of other configurations may be used to close the ends of the annular space S between the cup 30 and cones 32. For example, a suitable seal may have a seal case fitted to one of the end bores of the cup 30 and an elastomeric seal element bonded to the case and establishing a fluid barrier along the cylindrical surface 52 on the thrust rib 50 for the cone 32 at the corresponding end of the cup 30.

This invention is intended to cover all changes and modifications of the example of the invention herein chosen for purposes of the disclosure which do not constitute departures from the spirit and scope of the invention.

What is claimed is:

1. The combination comprising: an axle which revolves around an axis and has a journal which merges into a larger portion of the axle at a fillet; a backing ring fitted around the journal at the fillet and providing a first abutment surface that is located generally at the small end of the fillet where it is presented away from the fillet; an end member attached to the journal and providing a second abutment surface that is presented toward the first abutment surface; and a bearing located around the journal between the backing ring and the end member, the bearing including an outer race having raceways presented inwardly toward the axis, an inner race located within the outer race and around the journal, there being an interference fit between the inner race and the journal, the inner race having raceways presented outwardly toward the raceways of the outer race, such that an annular space exists between the races, and also having back faces that are against the abutment surface on the backing ring and end member, the inner race in the region of its back face that is against the end face of the backing ring being undercut so that the interference fit does not extend out to that back face and produce a stress concentration in the journal where the inner race and backing ring abut, rolling elements arranged in at least two rows between the raceways of the inner and outer races, and seals mounted on at least one of the races and cooperating with the other race to close the ends of the annular space between the races.

2. The combination according to claim 1 wherein the rolling elements are arranged in two rows; wherein the inner race includes two components, each of which has a raceway and a back face; and wherein the back face of the one component is against the abutment surface of the backing ring and the back face of the other component is against the abutment face of the end member.

3. The combination according to claim 2 wherein each component of the inner race has a cylindrical surface between its back face and its raceway, and the seals are located around the cylindrical surfaces of the components.

4. The combination according to claim 3 wherein $$n < 0.78f$$

where n is the distance between the large end of the fillet at the end of the journal and a plane located midway between the rolling elements of the two rows, and f is the diameter of the journal 5. The combination according to claim 3 wherein the axle includes a generally cylindrical main section and a generally cylindrical intervening section located between the main section and the journal and forms the end portion of the axle; and wherein $$d > e > f$$

where d is the diameter of the main section, e is the diameter of the intervening section, and f is the diameter of the journal.

6. The combination according to claim 1 wherein the abutment surface of the backing ring is essentially at the small end of the fillet.

7. The combination according to claim 1 wherein outer race is a unitary structure.

8. In a rail car, the combination comprising: an axle that revolves around an axis and at its end is provided with a journal which has an extended surface and a fillet which emerges from the extended surface to merge the journal into a larger adjoining portion of the axle; a backing ring fitted against the fillet and having an end face that is presented away from the fillet, with the end face being generally perpendicular to the axis and being located in the region where the fillet emerges from the extended surface; an end member attached firmly to the journal and having an end face which is presented toward, yet spaced from the end face of backing ring, the end face of the end member also being substantially perpendicular to the axis; an antifriction bearing including two cones fitted around the journal with an interference fit and located between the end faces of the backing ring and end member, with each having a tapered raceway presented away from the axis, a thrust rib located at and projecting beyond the large end of the raceway, and a back face on the end of the thrust rib beyond the raceway, the back face of the one cone being against the end face of the backing ring and the back face of the other cone being against the end face of the end member, said one cone having an undercut that leads out to its back face, so that the interference fit does not exist along the end face of the backing ring and contribute to stress concentration in the journal at the end of the fillet, the bearing also including a cup which surrounds the two ones and has two tapered raceways surrounding and presented toward, yet spaced from, the raceways on the cones, whereby an annular space exists between the cup and the cones, the bearing further including tapered rollers located in the annular space between the cup and cones and arranged in two circular rows, with the rollers of the one row contacting the raceway on the one cone and the surrounding raceway of the cup and the rollers of the other row contacting the raceway of the other cone and the surrounding raceway of the cup; and seals positioned at the ends of the annular space between the cup and cones where they establish fluid barriers that retain a lubricant in the annular space and prevent contaminants from entering it.

9. The combination according to claim 8 wherein the seals close the end of the annular space between the cup and cones at the ends of the cup and at the thrust ribs of the cones.

10. The combination according to claim 8 wherein the seals are fitted to the ends of the cup and to the thrust ribs of the cone.

11. The combination according to claim 8 wherein the larger portion of the axle includes an intervening portion from which the journal projects at the fillet and a main portion from which the intervening portion projects.

12. The combination according to claim 11 wherein $$d > e > f$$

where d is the diameter of the main section, e is the diameter of the intervening section, and f is the diameter of the journal.

13. The combination according to claim 8 wherein the cup is a unitary structure.

14. The combination according to claim 8 wherein each cone has an undercut that leads out to its back face, whereby the bearing may be reversed on the journal, and the undercuts do not extend beneath the raceways for the cones.

15. The combination according to claim 8 wherein $$n < 0.78f$$

where n is the distance between the large end of the fillet at the end of the journal and a plane located midway between the two rows of rollers, and f is the diameter of the journal.

16. The combination comprising: an axle which revolves around an axis and has a journal which merges into a larger portion of the axle at a fillet; a backing ring fitted around the journal at the fillet and providing a first abutment surface that is located generally at the small end of the fillet where it is presented away from the fillet; an end member attached to the journal and providing a second abutment surface that is presented toward the first abutment surface; and a bearing located around the journal between the backing ring and the end member, the bearing including an outer race having raceways presented inwardly toward the axis, an inner race located within the outer race and around the journal, there being an interference fit between the inner race and the journal, the inner race having raceways presented outwardly toward the raceways of the outer race, such that an annular space exists between the races, and also having back faces that are against the abutment surface on the backing ring and end member, the inner race in the region of its back face that is against the end face of the backing ring being undercut so that the interference fit does not extend out to the back face and produce a stress concentration in the journal where the inner race and backing ring abut, and rolling elements arranged in at least two rows between the raceways of the inner and outer races; and seals for closing the ends of the annular space between the races of the bearing.

* * * * *